United States Patent
Whitmarsh

(10) Patent No.: US 10,012,311 B2
(45) Date of Patent: Jul. 3, 2018

(54) HYDRAULIC CONTROL SYSTEM FOR AN AUTOMATIC TRANSMISSION HAVING A NEUTRAL LOCKED TURBINE MODE

(71) Applicant: GM Global Technology Operations LLC, Detroit, MI (US)

(72) Inventor: Brian W. Whitmarsh, Commerce, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 283 days.

(21) Appl. No.: 15/136,218

(22) Filed: Apr. 22, 2016

(65) Prior Publication Data

US 2016/0327152 A1    Nov. 10, 2016

Related U.S. Application Data

(60) Provisional application No. 62/157,272, filed on May 5, 2015.

(51) Int. Cl.
*F16H 59/00* (2006.01)
*F16H 61/00* (2006.01)
*F16H 63/00* (2006.01)
*F16H 61/02* (2006.01)

(52) U.S. Cl.
CPC ...... *F16H 61/0267* (2013.01); *F16H 61/0021* (2013.01); *F16H 61/0276* (2013.01); *F16H 2200/0069* (2013.01)

(58) Field of Classification Search
CPC ............ F16H 61/0267; F16H 61/0021; F16H 61/0276; B60W 10/30
See application file for complete search history.

(56) References Cited

U.S. PATENT DOCUMENTS

| | | |
|---|---|---|
| 4,106,367 A * | 8/1978 | Bouvet ............... F16H 61/0021 477/161 |
| 8,500,600 B2 | 8/2013 | Moorman |
| 8,591,381 B2 | 11/2013 | Zhang et al. |
| 2016/0167635 A1 | 6/2016 | Neelakantan et al. |
| 2016/0327152 A1* | 11/2016 | Whitmarsh ......... F16H 61/0267 |
| 2016/0327153 A1 | 11/2016 | Whitmarsh |

* cited by examiner

*Primary Examiner* — William J Cook

(57) ABSTRACT

A hydraulic control system for a transmission includes a reverse, a low gear ratio, and a high gear ratio during default conditions where the transmission loses electronic control. The hydraulic control system also provides neutral locked turbine capability that engages clutches to lock the transmission input shaft in order to generate heat. The hydraulic control system includes a manual valve, a default enable valve, a default select valve, and a plurality of clutch regulation valves. The neutral locked turbine capability may be engaged when the manual valve is in either a park or neutral position.

20 Claims, 5 Drawing Sheets

HYDRAULIC CONTROL SYSTEM FOR AN AUTOMATIC TRANSMISSION HAVING A NEUTRAL LOCKED TURBINE MODE

CROSS REFERENCE TO RELATED APPLICATIONS

This application claims benefit of U.S. Provisional Application No. 62/157,272 filed May 5, 2015. The disclosure of the above application is incorporated herein by reference.

TECHNICAL FIELD

The invention relates to a hydraulic control system for an automatic transmission, and more particularly to a hydraulic control system for an automatic transmission having a manual valve and two forward and one reverse default gear states and able to provide a neutral locked turbine mode.

BACKGROUND

A typical automatic transmission includes a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices. The pressurized hydraulic fluid delivered to the shift actuators is used to engage or disengage the torque transmitting devices in order to obtain different gear ratios.

While previous hydraulic control systems are useful for their intended purpose, the need exists for new and improved hydraulic control system configurations within transmissions which exhibit improved performance, especially during default conditions. A default condition is a hydraulic state that the transmission experiences in the absence of electronic control. A transmission in default no longer has the capability to electronically command solenoids to achieve the desired gear state. The default condition may have been intentionally commanded (e.g. when diagnostics indicate corrupt solenoid drivers, corrupt controllers, controller shutdown at high temperatures) or can occur unintentionally due to a hardware failure (e.g. controller failure, wiring harness failure, solenoid driver failure). For some transmission configurations, the hydraulic control system shifts the transmission to neutral during a default condition. Accordingly, there is a need for an improved, cost-effective hydraulic control system for use in a hydraulically actuated automatic transmission that provides multiple forward and reverse driving states during default conditions while also providing the ability to rapidly heat the motor vehicle during extreme cold conditions without degrading default performance.

SUMMARY

A hydraulic control system for a transmission is generally provided. The hydraulic control system provides a reverse, a low gear ratio, and a high gear ratio during default conditions where the transmission loses electronic control. The hydraulic control system includes a manual valve, a default enable valve, a default select valve, and a plurality of clutch regulation valves. The hydraulic control system is configured to control the clutch regulation valves to lock a transmission input shaft from rotation to provide a neutral locked turbine, i.e., a park turbine stall.

In one example, the hydraulic control system includes a pressure regulation subsystem in fluid communication with a pump for providing pressurized hydraulic fluid, a manual valve in direct fluid communication with the pressure regulation subsystem, wherein the manual valve is moveable by an operator of the motor vehicle between at least a park position, a neutral position, a drive position, and a reverse position, a plurality of clutch regulation valves each in direct fluid communication with the pressure regulation subsystem and in fluid communication with the manual valve, and a plurality of clutches selectively engaged by the plurality of clutch regulation valves. A first subset of the plurality of clutches are engaged to provide a neutral lock turbine mode when the manual valve is in the park position or the neutral position.

In one aspect the manual valve is in direct fluid communication with a default enable valve assembly which is in direct fluid communication with a default select valve assembly, wherein the default enable valve assembly enables three default modes of operation and the default select valve assembly selects between two of the three default modes of operation.

In another aspect, each of the plurality of clutch regulation valve assemblies includes an exhaust port that exhausts a respective one of the plurality of clutches in a normal mode of operation and wherein each of the exhaust ports is in selective communication with the default enable valve assembly and the default select valve assembly for selectively receiving pressurized hydraulic fluid to provide two forward gears and a reverse gear during a default mode of operation.

In another aspect, the exhaust ports of each of the plurality of clutch regulation valve assemblies selectively communicates with the default enable valve assembly or the default select valve assembly via a plurality of three-way valves.

In another aspect, the default enable valve assembly selectively communicates pressurized hydraulic fluid from the manual valve when in the drive position to the default select valve assembly, and wherein the default select valve assembly selectively communicates the pressurized hydraulic fluid to one of a second subset of the clutch regulation valve assemblies to provide a low gear ratio and to a third subset of the clutch regulation valve assemblies to provide a high gear ratio higher than the low gear ratio.

In another aspect, the default enable valve assembly selectively communicates pressurized hydraulic fluid from the manual valve when in the reverse position to a subset of the plurality of three-way valves to provide a reverse gear ratio.

In another aspect, the position of the default enable valve assembly is controlled by pressurized hydraulic fluid from the manual valve when in the drive or reverse positions and from pressurized hydraulic fluid from a feed limit valve assembly and a spring.

In another aspect, the position of the default select valve assembly is controlled by pressurized hydraulic fluid from one of the plurality of clutch regulation valve assemblies engaged in the low gear and from one of the plurality of clutch regulation valve assemblies engaged in the high gear and a second spring.

In another aspect, the plurality of clutches includes six clutches selectively engageable in combinations of four to provide at least 10 forward speed ratios and one reverse speed ratio.

In another aspect, a torque converter control subsystem is in fluid communication with the pressure regulation subsystem, and wherein the neutral lock turbine mode generates heat in the torque converter control subsystem by locking an input shaft of the transmission.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
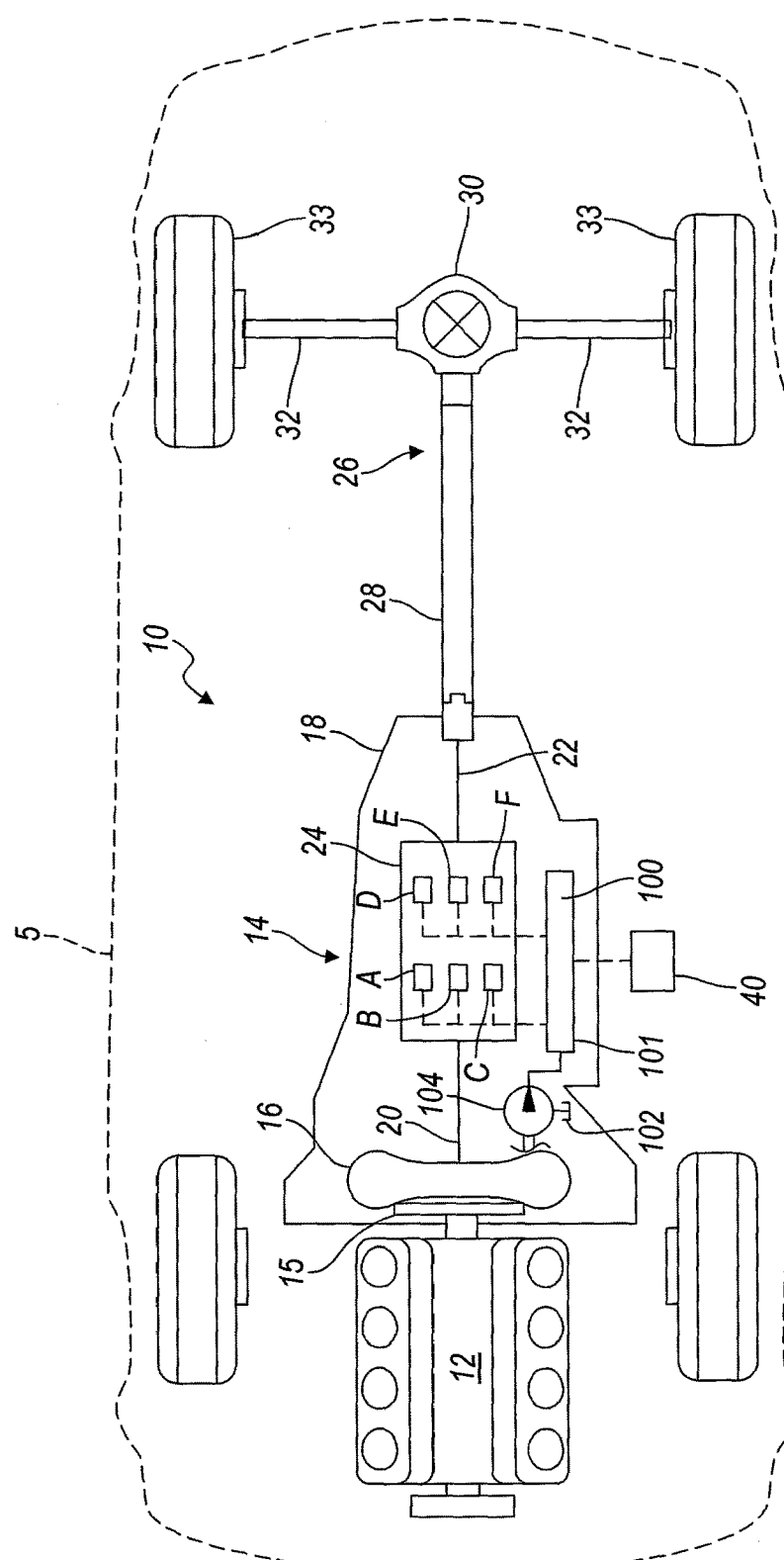
FIG. 1 is a is a schematic diagram of an exemplary powertrain in a motor vehicle.

With reference to FIG. 1, a motor vehicle is shown and generally indicated by reference number 5. The motor vehicle 5 is illustrated as a passenger car, but it should be appreciated that the motor vehicle 5 may be any type of vehicle, such as a truck, van, sport-utility vehicle, etc. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present invention. The powertrain 10 generally includes an engine 12 interconnected with a transmission 14.

The engine 12 may be a conventional internal combustion engine or an electric engine, hybrid engine, or any other type of prime mover, without departing from the scope of the present disclosure. The engine 12 supplies a driving torque to the transmission 14 through a flexplate 15 or other connecting device that is connected to a starting device 16. The starting device 16 may be a hydrodynamic device, such as a fluid coupling or torque converter, a wet dual clutch, or an electric motor. It should be appreciated that any starting device between the engine 12 and the transmission 14 may be employed including a dry launch clutch.

The transmission 14 has a typically cast, metal housing 18 which encloses and protects the various components of the transmission 14. The transmission housing 18 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a gear and clutch arrangement 24. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the gear and clutch arrangement 24.

The gear and clutch arrangement 24 includes a plurality of gear sets, six torque transmitting mechanisms indicated schematically by reference letters A-F, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The torque transmitting mechanisms A-F are selectively engageable in combinations of four to initiate at least one of ten forward gear or speed ratios and one reverse gear or speed ratio by selectively coupling individual gears within the plurality of gear sets to the plurality of shafts. In a preferred example, torque transmitting mechanisms A and B are friction brakes while torque transmitting mechanisms C-F are friction clutches. It should be appreciated that the specific arrangement and number of the gear sets and shafts within the transmission 14 may vary without departing from the scope of the present disclosure.

The motor vehicle 5 includes a transmission control module 40. The transmission control module 40 is preferably a non-generalized, electronic control device having a preprogrammed digital computer or processor, control logic or circuits, memory used to store data, and at least one I/O peripheral. The control logic includes or enables a plurality of logic routines for monitoring, manipulating, and generating data and control signals. The transmission control module 40 controls the actuation of the torque transmitting mechanisms A-F via a hydraulic control system 100.

The hydraulic control system 100 is disposed within a valve body 101 that contains and houses, via fluid paths and valve bores, most of the components of the hydraulic control system 100. These components include, but are not limited to, pressure regulation valves, directional valves, solenoids, etc. The valve body 101 may be attached to a bottom of the transmission housing 18 in rear-wheel drive transmissions or attached to a front of the transmission housing 18 in front-wheel drive transmissions. The hydraulic control system 100 is operable to selectively engage the clutches/brakes A-F and to provide cooling and lubrication to the transmission 14 by selectively communicating a hydraulic fluid from a sump 102 under pressure from either an engine driven pump 104 or an accumulator (not shown) or auxiliary electric pump (not shown). The pump 104 may be driven by the engine 12 or by an auxiliary engine or electric motor.

With reference to FIGS. 2A-D, a portion of the hydraulic control system 100 is illustrated. The hydraulic control system 100 generally includes a plurality of interconnected or hydraulically communicating subsystems including a pressure regulator subsystem 106 and a clutch control subsystem 108. The hydraulic control system 100 may also include various other subsystems or modules not illustrated in the drawings, such as a lubrication subsystem, a cooling subsystem, and a torque converter control subsystem each in communication with the pressure regulator subsystem 106.

The pressure regulator subsystem 106 is operable to provide and regulate pressurized hydraulic fluid, such as transmission oil, throughout the hydraulic control system 100. The pressure regulator subsystem 106 draws hydraulic fluid from the sump 102. The sump 102 is a tank or reservoir preferably disposed at the bottom of the transmission housing 18 to which the hydraulic fluid returns and collects from various components and regions of the transmission. The hydraulic fluid is forced from the sump 102 and communicated throughout the hydraulic control system 100 via the pump 104. The pump 104 may be, for example, a gear pump, a vane pump, a gerotor pump, or any other positive displacement pump. The hydraulic fluid from the pump 104 is controlled by a pressure regulator valve 112. The pressure regulator valve 112 regulates the pressure of the hydraulic fluid from the pump 104 and feeds pressurized hydraulic fluid at line pressure to a main supply line 114. The main supply line 114 may include other branches and feed other subsystems without departing from the scope of the present invention. The pressure regulator subsystem 106 may also include various other valves and solenoids, such as a backflow regulator valve, without departing from the scope of the present invention.

The clutch control subsystem 108 controls the engagement and release of the torque transmitting mechanisms A-F. The clutch control subsystem 108 generally includes a manual valve assembly 120, a feed limit low valve assembly 122, a feed limit high valve assembly 124, a default enable valve assembly 126, a default select valve assembly 128, and a plurality of clutch A-F regulation valve assemblies 130, 132, 134, 136, 138, and 140 each associated with one of the torque transmitting mechanisms A-F, as will be described below.

The main supply line 114 communicates with, i.e. is connected to, the manual valve assembly 120. The manual valve assembly 120 includes a manual valve 142 connected to a range selector (not shown). Movement of the range selector by an operator of the motor vehicle in turn translates the manual valve 142 between various positions including a reverse position and a drive position. The manual valve assembly 120 includes ports 120A-F, numbered consecutively from left to right in FIG. 2C. Ports 120A and 120F are exhaust ports that communicate with the sump 102. Port 120B is connected to a reverse feed line 144. Port 120C is connected to the main supply line 114. Ports 120D and 120E are connected to a drive feed line 146.

The manual valve 142 is slidably disposed within a bore 148 formed in the valve body 101. The manual valve 142 is moveable between at least a drive position and a reverse position, and may also include a neutral position or a park position. In the drive position, port 120C communicates with port 120D and port 120B exhausts through port 120A. In the reverse position, port 120C communicates with port 120B and port 120E exhausts through port 120F. Thus, pressurized fluid is selectively communicated from the main supply line 114 to one of the reverse feed line 144 and the drive feed line 146 depending on the position of the manual valve 142.

The feed limit low valve assembly 122 also receives pressurized hydraulic fluid from the main supply line 114. The feed limit low valve assembly 122 includes ports 122A-D, numbered consecutively from left to right in FIG. 2D. Ports 122A and 122C are connected to a feed limit low line 150. Port 122B is connected to the main supply line 114. Port 120D is an exhaust port that communicates with the sump 102.

The feed limit low valve assembly 122 further includes a feed limit low valve or spool 152 slidably disposed within a bore 154 formed in the valve body 101. The feed limit low valve 152 is moveable to regulate pressurized hydraulic fluid flow from port 122B to port 122C using feedback pressure via port 122A. A biasing member 156, such as a coiled spring, biases the feed limit low valve 152 against the feedback pressure acting on the feed limit low valve 152 communicated through port 122A. Thus, the balance of forces acting on the feed limit low valve 152 controls the flow of hydraulic fluid from port 122B to port 122C.

The feed limit high valve assembly 124 operates in a manner similar to the feed limit low valve assembly 122. The feed limit high valve assembly 124 also receives pressurized hydraulic fluid from the main supply line 114. The feed limit high valve assembly 124 includes ports 124A-D, numbered consecutively from left to right in FIG. 2D. Ports 124A and 124C are connected to a feed limit high line 158. Port 124B is connected to the main supply line 114. Port 120D is an exhaust port that communicates with the sump 102.

The feed limit high valve assembly 124 further includes a feed limit high valve or spool 160 slidably disposed within a bore 162 formed in the valve body 101. The feed limit high valve 160 is moveable to regulate pressurized hydraulic fluid flow from port 124B to port 124C using feedback pressure via port 124A. A biasing member 164, such as a coiled spring, biases the feed limit high valve 160 against the feedback pressure acting on the feed limit high valve 160 communicated through port 124A. Thus, the balance of forces acting on the feed limit high valve 160 controls the flow of hydraulic fluid from port 124B to port 124C.

The reverse and drive feed lines 144, 146 communicate with a three-way ball check valve 166 and the default enable valve assembly 126. The three-way ball check valve 166 includes three ports 166A-C. Port 166A is connected to the drive feed line 146. Port 166B is connected to the reverse feed line 144. Port 166C is connected to a drive/reverse (drv/rev) feed line 170. The drv/rev feed line 170 communicates with the default enable valve assembly 126. The three-way ball check valve 166 closes off whichever of the ports 166A and 166B that is delivering the lower hydraulic pressure and provides communication between whichever of the ports 166A and 166B having or delivering the higher hydraulic pressure and the outlet port 166C.

Figure 2A:
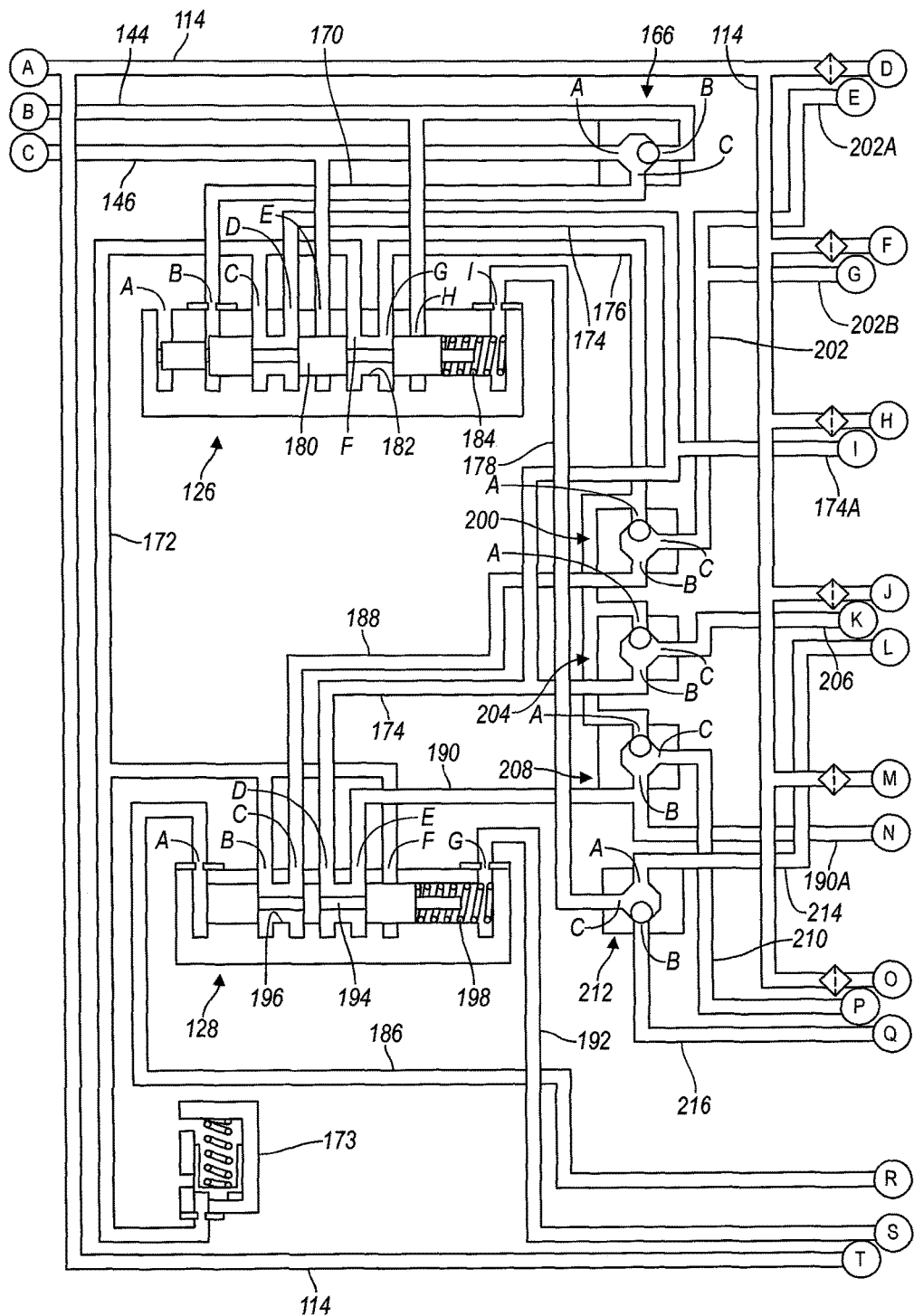
FIG. 2A is a diagram of a portion of a hydraulic control system according to the principles of the present invention.
Figure 2B:
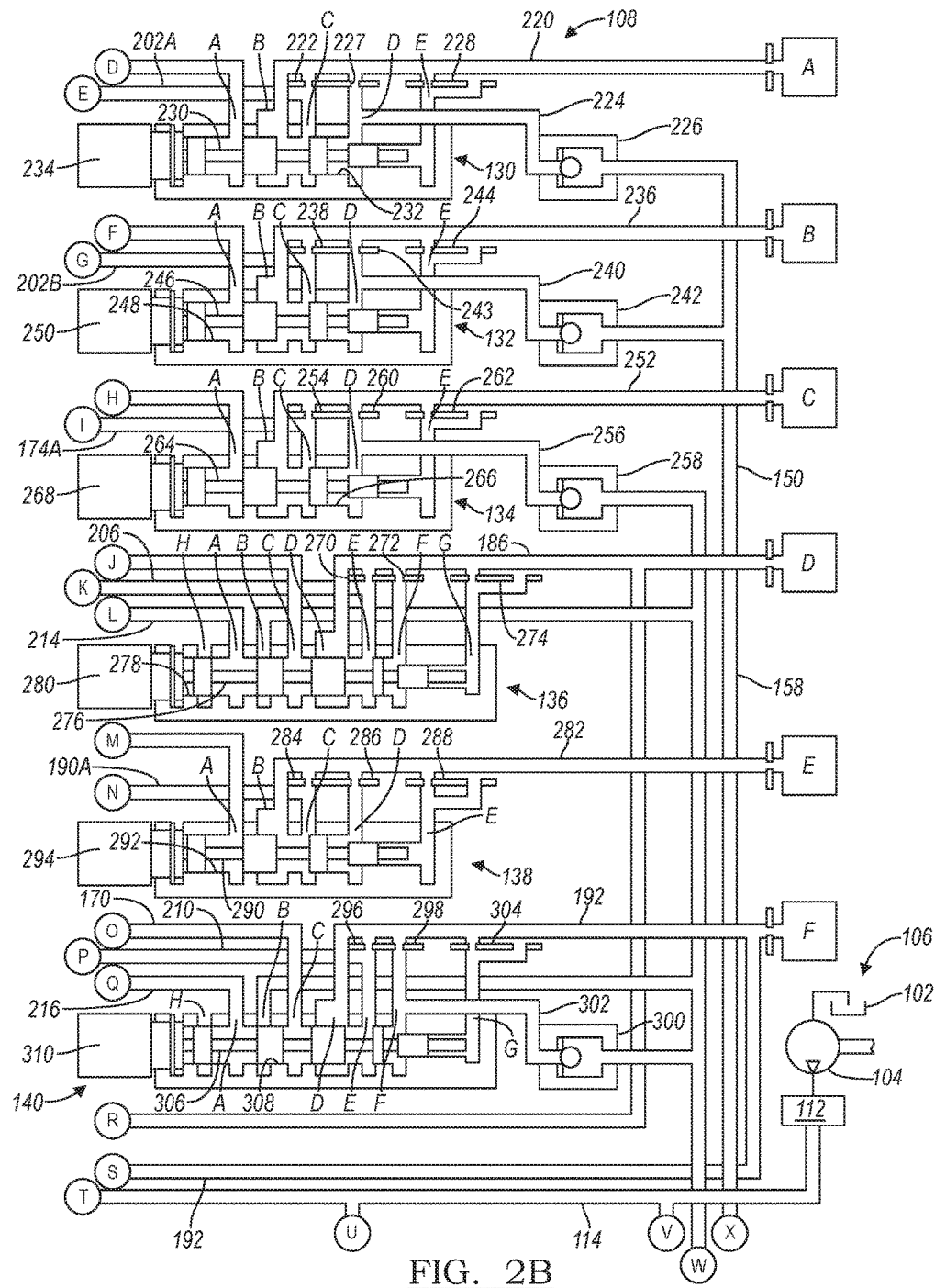
FIG. 2B is a diagram of a portion of a hydraulic control system according to the principles of the present invention.
Figure 2C:
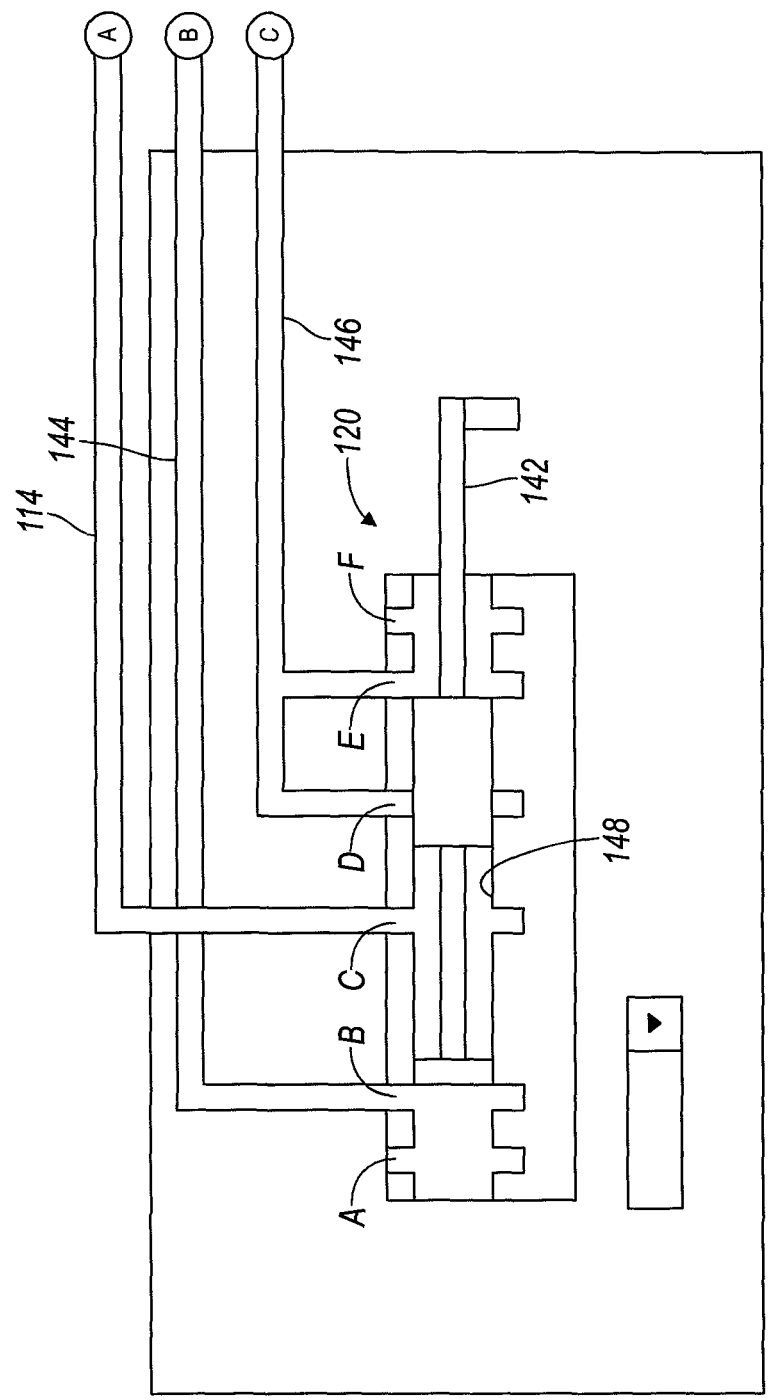
FIG. 2C is a diagram of a portion of a hydraulic control system according to the principles of the present invention.
Figure 2D:
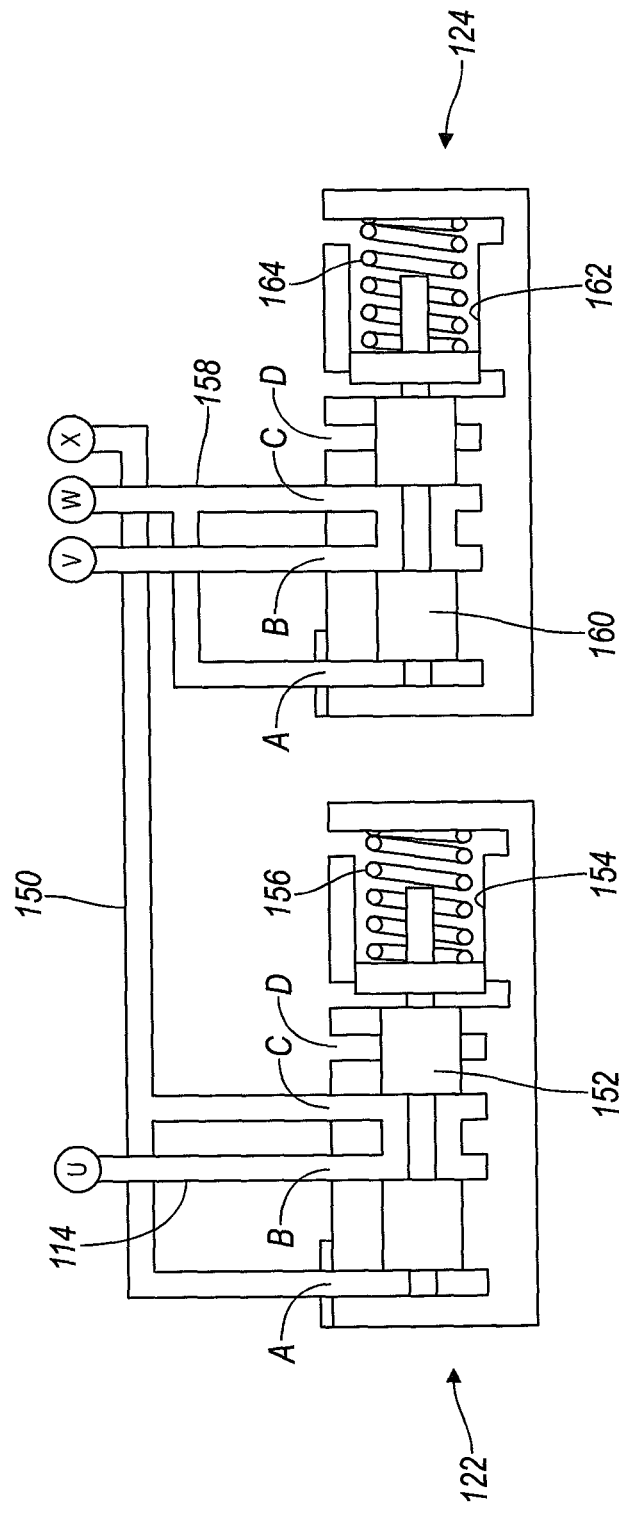
FIG. 2D is a diagram of a portion of a hydraulic control system according to the principles of the present invention.

The default enable valve assembly 126 includes ports 126A-I, numbered consecutively from left to right in FIG. 2A. Port 126A is an exhaust port that communicates with the sump 102. Port 126G is connected to the drv/rev feed line 170. Ports 126C and 126F are connected to an exhaust backfill circuit 172 and blow-off valve 173 which preferably opens at low pressure, e.g., approximately 3 psi. Port 126D is connected to a drive default line 174. Port 126E is connected to the drive feed line 146. Port 126G is connected to a reverse default line 176. Port 126H is connected to the reverse feed line 144. Port 126I is connected to a clutch D/F signal line 178.

The default enable valve assembly 126 further includes a default enable valve or spool 180 slidably disposed within a bore 182 formed in the valve body 101. The default enable valve 180 is moveable between a default disable position, shown in FIG. 2A, and a default enable position where the valve 180 is moved to the right. A biasing member 184, such as a coiled spring, biases the default enable valve 180 to the default disable position. In the default disable position, port 126D communicates with port 126C, port 126E is closed, port 126F communicates with port 126G, and port 126H is closed. In the default enable position, port 126C is closed, port 126D communicates with port 126E, port 126F is closed, and port 126G communicates with port 126H.

The default select valve assembly 128 is used to determine whether second or seventh gear is engaged during a transmission default condition. The default select valve assembly 128 includes ports 128A-G, numbered consecutively from left to right in FIG. 2A. Port 128A is connected to a clutch D feed line 186. Ports 128B and 128F are connected to the exhaust backfill circuit 172. Port 128C is connected to clutch A/B exhaust line 188. Port 128D is connected to the drive default line 174. Port 128E is connected to a clutch E/F exhaust line 190. Port 128G is connected to a clutch F feed line 192.

The default select valve assembly 128 further includes a default select valve or spool 194 slidably disposed within a bore 196 formed in the valve body 101. The default select valve 194 is moveable between a first position, shown in FIG. 2A, and a second position where the valve 194 is moved to the right. A biasing member 198, such as a coiled spring, biases the default select valve 194 to the first position. In the first position, port 128B communicates with port 128C, port 128D communicates with port 128E, and port 128F is closed. In the second position, port 128B is closed, port 128C communicates with port 128D, and port 128E communicates with port 128F.

The reverse default line 176 and the clutch A/B exhaust line 188 communicate with a three-way ball check valve 200. The three-way ball check valve 200 includes three ports 200A-C. Port 200A is connected to the reverse default line 176. Port 200B is connected to the clutch A/B exhaust line 188. Port 200C is connected to an exhaust line 202 having a clutch A branch 202A and a clutch B branch 202B. The clutch A branch 202A is connected with the clutch A regulation valve assembly 130 and the clutch B branch 202B is connected with the clutch B regulation valve assembly 132. The three-way ball check valve 200 closes off whichever of the ports 200A and 200B that is delivering the lower hydraulic pressure and provides communication between whichever of the ports 200A and 200B having or delivering the higher hydraulic pressure and the outlet port 200C.

The reverse default line 176 and the drive default line 174 communicate with a three-way ball check valve 204. The three-way ball check valve 204 includes three ports 204A-C. Port 204A is connected to the rev dlft line 176. Port 204B is connected to the drive default line 174. Port 204C is connected to a clutch D exhaust line 206. The clutch D exhaust line is connected with the clutch D regulation valve assembly 136. The three-way ball check valve 204 closes off whichever of the ports 204A and 204B that is delivering the lower hydraulic pressure and provides communication between whichever of the ports 204A and 204B having or delivering the higher hydraulic pressure and the outlet port 204C.

The reverse default line 176 and the clutch E/F exhaust line 190 communicate with a three-way ball check valve 208. The three-way ball check valve 208 includes three ports 208A-C. Port 208A is connected to the rev dlft line 176. Port 208B is connected to the clutch E/F exhaust line 190. Port 208C is connected to a clutch F exhaust line 210. The clutch E/F exhaust line 190 includes a clutch E exhaust branch 190A that is connected to the clutch E regulation valve 138. The clutch F exhaust line 210 is connected with the clutch F regulation valve 140. The three-way ball check valve 208 closes off whichever of the ports 208A and 208B that is delivering the lower hydraulic pressure and provides communication between whichever of the ports 208A and 208B having or delivering the higher hydraulic pressure and the outlet port 208C.

The position of the default enable valve assembly 126 may be commanded by pressurized fluid communicated through the signal line 178 through a three-way ball check valve 212. The three-way ball check valve 212 includes three ports 212A-C. Port 212A is connected to a clutch D signal line 214. Port 212B is connected to a clutch F signal line 216. Port 212C is connected to the signal line 178. The three-way ball check valve 212 closes off whichever of the ports 212A and 212B that is delivering the lower hydraulic pressure and provides communication between whichever of the ports 212A and 212B having or delivering the higher hydraulic pressure and the outlet port 212C.

The main supply line 114 feeds the clutch A regulation valve assembly 130, the clutch B regulation valve assembly 132, the clutch C regulation valve assembly 134, the clutch D regulation valve assembly 136, the clutch E regulation valve assembly 138, and the clutch F regulation valve assembly 140. Therefore, each of these regulation valves may be engaged so long as pressurized oil is supplied to the main supply line 114, even if the manual valve assembly 120 is in a neutral or non-drive condition, as will be explained below.

The clutch A regulation valve assembly 130 controls the actuation of the clutch A. The clutch A regulation valve assembly 130 includes ports 130A-E, numbered consecutively from left to right in FIG. 2B. Port 130A is connected to the main supply line 114. Port 130B is connected to a clutch A feed line 220 that communicates with clutch A. Port 130C is connected to the clutch A exhaust branch 202A and to the clutch A feed line 220 via an orifice 222. Port 130D is connected to a fluid line 224 that communicates with a one-way valve 226 and with the clutch A feed line 220 via an orifice 227. The one-way valve communicates with the feed limit low line 150 and selectively allows fluid communication from the fluid line 224 to the feed limit low line 150. Port 130E communicates with the clutch A feed line 220 via an orifice 228 and exhausts to the sump 102.

The clutch A regulation valve assembly 130 further includes a clutch A valve or spool 230 slidably disposed within a bore 232 formed in the valve body 101. The clutch A valve 230 is moveable between a disengaged position, shown in FIG. 2B, and an engaged position where the valve 230 is moved to the right. The clutch A valve 230 is moveable by a solenoid 234. The solenoid 234 is preferably a normally low, linear force solenoid. In the disengaged position, port 130A is isolated, port 130B communicates with port 130C to exhaust the clutch A feed line 220 through the clutch A exhaust branch 202A, and port 130D acts on a differential area of the clutch A valve 230. In the engaged position, port 130A communicates with port 130B to provide pressurized fluid to clutch A. Excess pressure in the fluid line 224 opens the one-way valve 226 when the pressure exceeds that provided by the feed limit low valve assembly 122, thus bleeding off the pressure acting on the differential area of the clutch A valve 230.

The clutch B regulation valve assembly 132 controls the actuation of the clutch B. The clutch B regulation valve assembly 132 includes ports 132A-E, numbered consecutively from left to right in FIG. 2B. Port 132A is connected to the main supply line 114. Port 132B is connected to a clutch B feed line 236 that communicates with clutch B. Port 132C is connected to clutch B exhaust branch 202B and to the clutch B feed line 236 via an orifice 238. Port 132D is connected to a fluid line 240 that communicates with a one-way valve 242 and with the clutch B feed line 236 via an orifice 243. The one-way valve 242 communicates with the feed limit low line 150 and selectively allows fluid communication from the fluid line 240 to the feed limit low line 150. Port 132E communicates with the clutch B feed line 236 via an orifice 244 and exhausts to the sump 102.

The clutch B regulation valve assembly 132 further includes a clutch B valve or spool 246 slidably disposed within a bore 248 formed in the valve body 101. The clutch B valve 246 is moveable between a disengaged position, shown in FIG. 2B, and an engaged position where the valve 246 is moved to the right. The clutch B valve 246 is moveable by a solenoid 250. The solenoid 250 is preferably a normally low, linear force solenoid. In the disengaged position, port 132A is isolated, port 132B communicates with port 132C to exhaust the clutch B feed line 236 through the clutch B exhaust branch 202B, and port 132D is acts on a differential area of the clutch B valve 246. In the engaged position, port 132A communicates with port 132B to provide pressurized fluid to clutch B. Excess pressure in the fluid line 240 opens the one-way valve 242 when the pressure exceeds that provided by the feed limit low valve assembly 122, thus bleeding off the pressure acting on the differential area of the clutch B valve 246.

The clutch C regulation valve assembly 134 controls the actuation of the clutch C. The clutch C regulation valve assembly 134 includes ports 134A-E, numbered consecutively from left to right in FIG. 2B. Port 134A is connected to the main supply line 114. Port 134B is connected to a clutch C feed line 252 that communicates with clutch C. Port 134C is connected to a clutch C exhaust branch 174A of the drive default line 174 and to the clutch C feed line 252 via an orifice 254. Port 134D is connected to a fluid line 256 that communicates with a one-way valve 258 and with the clutch C feed line 252 via an orifice 260. The one-way valve 258 communicates with the feed limit high line 158 and selectively allows fluid communication from the fluid line 256 to the feed limit high line 158. Port 134E communicates with the clutch C feed line 252 via an orifice 262 and exhausts to the sump 102.

The clutch C regulation valve assembly 134 further includes a clutch C valve or spool 264 slidably disposed within a bore 266 formed in the valve body 101. The clutch C valve 264 is moveable between a disengaged position, shown in FIG. 2B, and an engaged position where the valve 264 is moved to the right. The clutch C valve 264 is moveable by a solenoid 268. The solenoid 268 is preferably a normally low, linear force solenoid. In the disengaged position, port 134A is isolated, port 134B communicates with port 134C to exhaust the clutch C feed line 252 through the drive default line 174, and port 134D acts on a differential area of the clutch C valve 264. In the engaged position, port 134A communicates with port 134B to provide pressurized fluid to clutch C. Excess pressure in the fluid line 256 opens the one-way valve 258 when the pressure exceeds that provided by the feed limit high valve assembly 124, thus bleeding off the pressure acting on the differential area of the clutch C valve 264.

The clutch D regulation valve assembly 136 controls the actuation of the clutch D. The clutch D regulation valve assembly 136 includes ports 136A-H. Port 136A is connected to the clutch D signal line 214. Port 136B is connected to the feed limit high line 158. Port 136C is connected to the main supply line 114. Port 136D is connected to the clutch D feed line 186 that communicates with clutch D. Port 136E is connected to the clutch D exhaust line 206 and to the clutch D feed line 186 via an orifice 270. Port 136F is connected to the clutch D feed line 186 via an orifice 272. Port 136G communicates with the clutch D feed line 186 via an orifice 274 and exhausts to the sump 102. Port 136H is an exhaust port that communicates with the sump 102.

The clutch D regulation valve assembly 136 further includes a clutch D valve or spool 276 slidably disposed within a bore 278 formed in the valve body 101. The clutch D valve 276 is moveable between a disengaged position, shown in FIG. 2B, and an engaged position where the valve 276 is moved to the right. The clutch D valve 276 is moveable by a solenoid 280. The solenoid 280 is preferably a normally low, linear force solenoid. In the disengaged position, port 136A communicates with port 136H, port 136B is closed, port 136C is isolated, port 136D communicates with port 136E to exhaust the clutch D feed line 186 through the clutch D exhaust line 206, and port 136F acts on a differential area of the clutch D valve 276. In the engaged position, port 136A communicates with port 136B to provide pressurized fluid from the feed limit high valve assembly 124 to the clutch D signal line 214, port 136C communicates with port 136D to provide pressurized fluid to the clutch D feed line 186, and port 136E is isolated.

The clutch E regulation valve assembly 138 controls the actuation of the clutch E. The clutch E regulation valve assembly 138 includes ports 138A-E, numbered consecutively from left to right in FIG. 2B. Port 138A is connected to the main supply line 114. Port 138B is connected to a clutch E feed line 282 that communicates with clutch E. Port 138C is connected to the clutch E exhaust branch 190A and to the clutch E feed line 282 via an orifice 284. Port 138D is connected to the clutch E feed line 282 via an orifice 286. Port 138E communicates with the clutch E feed line 282 via an orifice 288 and exhausts to the sump 102.

The clutch E regulation valve assembly 138 further includes a clutch E valve or spool 290 slidably disposed within a bore 292 formed in the valve body 101. The clutch E valve 290 is moveable between a disengaged position, shown in FIG. 2B, and an engaged position where the valve 290 is moved to the right. The clutch E valve 290 is moveable by a solenoid 294. The solenoid 294 is preferably a normally low, linear force solenoid. In the disengaged position, port 138A is isolated, port 138B communicates with port 138C to exhaust the clutch E feed line 282 through the clutch E exhaust branch 190A, and port 138D acts on a differential area of the clutch E valve 290. In the engaged position, port 138A communicates with port 138B to provide pressurized fluid to clutch E and port 138C is isolated.

The clutch F regulation valve assembly 140 controls the actuation of the clutch F. The clutch F regulation valve assembly 140 includes ports 140A-H. Port 140A is connected to the clutch F signal line 216. Port 140B is connected to the feed limit high line 158. Port 140C is connected to the main supply line 114. Port 140D is connected to the clutch F feed line 192 that communicates with clutch F. Port 140E is connected to the clutch F exhaust line 210 and to the clutch F feed line 192 via an orifice 296. Port 140F is connected to the clutch F feed line 192 via an orifice 298 and to a one-way valve 300 via a fluid line 302. The one-way valve 300 communicates with the feed limit high line 158 and selectively allows fluid communication from the fluid line 302 to the feed limit high line 158. Port 140G communicates with the clutch F feed line 192 via an orifice 304 and exhausts to the sump 102. Port 140H is an exhaust port that communicates with the sump 102.

The clutch F regulation valve assembly 140 further includes a clutch F valve or spool 306 slidably disposed within a bore 308 formed in the valve body 101. The clutch F valve 306 is moveable between a disengaged position, shown in FIG. 2B, and an engaged position where the valve 306 is moved to the right. The clutch F valve 306 is moveable by a solenoid 310. The solenoid 310 is preferably a normally low, linear force solenoid. In the disengaged position, port 140A communicates with port 140H, port 140B is closed, port 140C is isolated, port 140D communicates with port 140E to exhaust the clutch F feed line 192 through the clutch F exhaust line 210, and port 140F acts on a differential area of the clutch F valve 306. In the engaged position, port 140A communicates with port 140B to provide pressurized fluid from the feed limit high valve assembly 124 to the clutch F signal line 216, port 140C communicates with port 140D to provide pressurized fluid to the clutch F feed line 192, and port 140E is isolated. Excess pressure in fluid line 302 opens the one-way valve 300 when the pressure exceeds that provided by the feed limit high valve assembly 124, thus bleeding off the pressure acting on the differential area of the clutch F valve 306.

The hydraulic control system 100 is operable to provide two alternative forward gear ratios and one reverse gear ratio during a transmission default condition. During a default condition, where the transmission 14 experiences an absence of electronic control, the transmission 14 no longer has the capability to electronically command solenoids to achieve the desired gear state. Accordingly, the solenoids 234, 250, 268, 280, 294, and 310 are deactivated and the corresponding valves 230, 246, 264, 276, 290, and 306 are in the disengaged state. Meanwhile, the regulated pressure supplied to the main supply line 114 from the pressure regulation subsystem 106 defaults to the pressure provided from the pump 104.

During a default condition while in a reverse gear state the transmission 14 provides the reverse gear ratio rather than defaulting to neutral. To establish a reverse gear ratio, clutches A, B, D, F must be engaged, i.e., supplied with pressurized hydraulic fluid or oil. When the manual valve 142 is in the reverse position (moved to the left in FIG. 2C), oil is communicated to the reverse feed line 144. The three-way ball check valve 166 closes port 166A and feeds the drv/rev feed line 170. The clutch D signal line 214 exhausts through the clutch D regulation valve assembly 136 and the clutch F signal line 216 exhausts through the clutch F regulation valve assembly 140. Thus, the clutch D/F signal line 178 exhausts and the oil from the drv/rev line 170 moves the default enable valve 180 to the default enable position. In this position, the oil from the reverse feed line 144 feeds the reverse default line 176, closing ports 200B, 204B, and 208B in the check valves 200, 204, and 208. The reverse oil therefore feeds the clutch A exhaust branch 202A, the clutch B exhaust branch 202B, the clutch D exhaust line 206, and the clutch F exhaust line 210. Reverse oil in the clutch A exhaust branch 202A communicates through ports 130B and 130C in the clutch A regulation valve assembly 130 to feed the clutch A feed line 220, thereby engaging clutch A. Reverse oil in the clutch B exhaust branch 202B communicates through ports 132B and 132C in the clutch B regulation valve assembly 132 to feed the clutch B feed line 236, thereby engaging clutch B. Reverse oil in the clutch D exhaust line 206 communicates through ports 136D and 136E in the clutch D regulation valve assembly 136 to feed the clutch D feed line 186, thereby engaging clutch D. Reverse oil in the clutch F exhaust line 210 communicates through ports 140D and 140E in the clutch F regulation valve assembly 140 to feed the clutch F feed line 192, thereby engaging clutch F. Therefore, during the default condition, clutches A, B, D, and F are engaged, thereby providing a reverse gear ratio.

During a default condition while in a $1^{st}$ $2^{nd}$, and $3^{rd}$ gear state, the transmission 14 provides the $2^{nd}$ gear ratio during the default. To establish the $2^{nd}$ gear ratio, clutches A, B, C, D must be engaged, i.e., supplied with pressurized oil. When the manual valve 142 is in the drive position (moved to the right in FIG. 2C), oil is communicated to the drive feed line 146. The check valve 166 closes port 166B and feeds the drv/rev line 170. The clutch D signal line 214 exhausts through the clutch D regulation valve assembly 136 and the clutch F signal line 216 exhausts through the clutch F regulation valve assembly 140. Thus, the clutch D/F signal line 178 exhausts and the oil from the drv/rev line 170 moves the default enable valve 180 to the default enable position. In this position, the oil from the drive feed line 146 feeds the drive default line 174, closing port 204A in the check valve 204 while feeding the clutch C exhaust branch 174A. Drive oil in the clutch C exhaust branch 174A communicates through ports 134B and 134C in the clutch C regulation valve assembly 134 to feed the clutch C feed line 252, thereby engaging clutch C. Drive oil from the drive default line 174 communicates through the check valve 204 to the clutch D exhaust line 206. Drive oil in the clutch D exhaust line 206 communicates through ports 136D and 136E in the clutch D regulation valve assembly 136 to feed the clutch D feed line 186, thereby engaging clutch D. Meanwhile, the position of the default select valve assembly 128 is determined by pressure in the clutch D feed line 186, the clutch F feed line 192, and the spring 198. In $1^{st}$, $2^{nd}$, and $3^{rd}$ gears, pressure in the clutch D feed line 186 is high since clutch D is engaged in those gear ratios while the clutch F feed line 192 is exhausted via the clutch E/F exhaust line 190 and the exhaust backfill circuit 172. The pressure in the clutch D feed line 186 thus moves the default select valve 194 to the second position against the bias of the spring 198. In this position, drive oil in the drive default line 174 communicates through ports 128D and 128C in the default select valve assembly 128 to the clutch A/B exhaust line 188. Drive oil then closes port 200A in the three-way ball check valve 200 and feeds the clutch A exhaust branch 202A and the clutch B exhaust branch 202B. Drive oil in the clutch A exhaust branch 202A communicates through ports 130B and 130C in the clutch A regulation valve assembly 130 to feed the clutch A feed line 220, thereby engaging clutch A. Drive oil in the clutch B exhaust branch 202B communicates through ports 132B and 132C in the clutch B regulation valve assembly 132 to feed the clutch B feed line 236, thereby engaging clutch B. Therefore, during the low gear default condition, clutches A, B, C, and D are engaged, thereby providing a second gear ratio.

During a default condition while in a $4^{th}$, $5^{th}$, $6^{th}$, $7^{th}$, $8^{th}$, $9^{th}$ and $10^{th}$ gear state, the transmission 14 provides the $7^{th}$ gear ratio during the default. To establish the $7^{th}$ gear ratio, clutches C, D, E, F must be engaged, i.e., supplied with pressurized hydraulic fluid or oil. When the manual valve 142 is in the drive position (moved to the right in FIG. 2C), oil is communicated to the drive feed line 146. The check valve 166 closes port 166B and feeds the drv/rev line 170. The clutch D signal line 214 exhausts through the clutch D regulation valve assembly 136 and the clutch F signal line 216 exhausts through the clutch F regulation valve assembly 140. Thus, the clutch D/F signal line 178 exhausts and the oil from the drv/rev line 170 moves the default enable valve 180 to the default enable position. In this position, the oil from the drive feed line 146 feeds the drive default line 174, closing port 204A in the check valve 204 while feeding the clutch C exhaust branch 174A. Drive oil in the clutch C exhaust branch 174A communicates through ports 134B and 134C in the clutch C regulation valve assembly 134 to feed the clutch C feed line 252, thereby engaging clutch C. Drive oil from the drive default line 174 communicates through the check valve 204 to the clutch D exhaust line 206. Drive oil in the clutch D exhaust line 206 communicates through ports 136D and 136E in the clutch D regulation valve assembly 136 to feed the clutch D feed line 186, thereby engaging clutch D. In $4^{th}$, $5^{th}$, $6^{th}$, $7^{th}$, $8^{th}$, $9^{th}$ and $10^{th}$ gears, pressure in the clutch D feed line 186 may be high or low depending on whether clutch D is engaged while the clutch F feed line 192 is high since clutch F is engaged in $4^{th}$-$10^{th}$ gears. Therefore, the combination of the forces due to the pressure from the clutch F feed line 192 and the spring 198 keeps the default select valve 194 in the first position. In this position, drive oil in the drive default line 174 communicates through ports 128D and 128E to the clutch E/F exhaust line 190. The drive oil in the clutch E/F exhaust line 190 feeds the clutch E exhaust branch 190A and closes port 208A in the check valve 208 to feed the clutch F exhaust line 210. Drive oil in the clutch E exhaust branch 190A communicates through ports 138B and 138C in the clutch E regulation valve assembly 138 to feed the clutch E feed line 282, thereby engaging clutch E. Drive oil in the clutch F exhaust line 210 communicates through ports 140D and 140E in the clutch F regulation valve assembly 140 to feed the clutch F feed line 192, thereby engaging clutch F. Therefore, during the default condition, clutches C, D, E, and F are engaged, thereby providing the $7^{th}$ gear ratio.

In some conditions it may be desirable to increase the load on the engine 12 by increasing the load on the transmission input shaft 20, otherwise known as a neutral locked turbine mode. This may be desirable, for example, where the engine 12 is a Diesel engine, in order to rapidly heat the passenger compartment of the motor vehicle during extreme cold conditions. To increase the load on the transmission input shaft 20, one or a combination of the clutches A, B, C, D, E, and F are engaged to lock the transmission input shaft 20 from rotating. Since the clutch regulation valve assemblies 130, 132, 134, 136, 138, and 140 are supplied pressurized oil from the main supply line 114, the clutches A, B, C, D, E and F may be engaged when the manual valve 142 is in any position. For example, applying clutches B, C, D, and E while in park ties up the transmission input shaft 20. Alternatively clutches A, B, C, and F may be engaged to create a similar input tie-up state. In the neutral locked turbine mode, the engine 12 continues to run even as the transmission input shaft 20 is locked, thus increasing the heat in the starting device 16 which may then be used to heat the passenger compartment.

For purposes of the present application, a "clutch", unless otherwise noted, refers to any torque transmitting mechanism that either clutches two rotatable members together or clutches one rotatable member to a stationary member. Thus, the term "clutch" as used herein also encompasses a "brake". A "port" refers to the portion or opening in the valve body that communicates between a bore or cavity and a fluid line. A "line" refers to any fluid communication passageway that communicates fluid signals, either defined in the valve body or via tubing, and may have additional branches, turns, orifices, filters, and other features not specifically depicted in the drawings without departing form the scope of the present invention. "Direct" fluid communication, as used herein, refers to fluid communication between a first component or subsystem and a second component or subsystem without any intervening component or subsystem that may selectively or permanently prevent fluid communication between the first component or subsystem and the second component or subsystem.

The description of the invention is merely exemplary in nature and variations that do not depart from the general essence of the invention are intended to be within the scope of the invention. Such variations are not to be regarded as a departure from the spirit and scope of the invention.

The following is claimed:

1. A hydraulic control system for a transmission of a motor vehicle, the hydraulic control system comprising:
    a pressure regulation subsystem in fluid communication with a pump for providing pressurized hydraulic fluid;
    a manual valve in direct fluid communication with the pressure regulation subsystem, wherein the manual valve is moveable by an operator of the motor vehicle between at least a park position, a neutral position, a drive position, and a reverse position;
    a plurality of clutch regulation valve assemblies each in direct fluid communication with the pressure regulation subsystem and in fluid communication with the manual valve; and
    a plurality of clutches selectively engaged by the plurality of clutch regulation valves,
    wherein a first subset of the plurality of clutches are engaged to provide a neutral lock turbine mode when the manual valve is in the park position or the neutral position.

2. The hydraulic control system of claim 1 wherein the manual valve is in direct fluid communication with a default enable valve assembly which is in direct fluid communication with a default select valve assembly, wherein the default enable valve assembly enables three default modes of operation and the default select valve assembly selects between two of the three default modes of operation.

3. The hydraulic control system of claim 2 wherein each of the plurality of clutch regulation valve assemblies includes an exhaust port that exhausts a respective one of the plurality of clutches in a normal mode of operation and wherein each of the exhaust ports is in selective communication with the default enable valve assembly and the default select valve assembly for selectively receiving pressurized hydraulic fluid to provide two forward gears and a reverse gear during a default mode of operation.

4. The hydraulic control system of claim 3 wherein the exhaust ports of each of the plurality of clutch regulation valve assemblies selectively communicates with the default enable valve assembly or the default select valve assembly via a plurality of three-way valves.

5. The hydraulic control system of claim 4 wherein the default enable valve assembly selectively communicates pressurized hydraulic fluid from the manual valve when in the drive position to the default select valve assembly, and wherein the default select valve assembly selectively communicates the pressurized hydraulic fluid to one of a second subset of the clutch regulation valve assemblies to provide a low gear ratio and to a third subset of the clutch regulation valve assemblies to provide a high gear ratio higher than the low gear ratio.

6. The hydraulic control system of claim 5 wherein the default enable valve assembly selectively communicates pressurized hydraulic fluid from the manual valve when in the reverse position to a subset of the plurality of three-way valves to provide a reverse gear ratio.

7. The hydraulic control system of claim 6 wherein the position of the default enable valve assembly is controlled by pressurized hydraulic fluid from the manual valve when in the drive or reverse positions and from pressurized hydraulic fluid from a feed limit valve assembly and a spring.

8. The hydraulic control system of claim 7 wherein the position of the default select valve assembly is controlled by pressurized hydraulic fluid from one of the plurality of clutch regulation valve assemblies engaged in the low gear and from one of the plurality of clutch regulation valve assemblies engaged in the high gear and a second spring.

9. The hydraulic control system of claim 1 wherein the plurality of clutches includes six clutches selectively engageable in combinations of four to provide at least 10 forward speed ratios and one reverse speed ratio.

10. The hydraulic control system of claim 1 further comprising a torque converter control subsystem in fluid communication with the pressure regulation subsystem, and wherein the neutral lock turbine mode generates heat in the torque converter control subsystem by locking an input shaft of the transmission.

11. A hydraulic control system for a transmission of a motor vehicle, the hydraulic control system comprising:
　a pressure regulation subsystem in fluid communication with a pump for providing pressurized hydraulic fluid;
　a manual valve in direct fluid communication with the pressure regulation subsystem, wherein the manual valve is moveable by an operator of the motor vehicle between at least a park position, a neutral position, a drive position, and a reverse position and selectively provides a drive fluid signal and a reverse fluid signal from the pressurized hydraulic fluid;
　a default enable valve assembly that receives the drive fluid signal and the reverse fluid signal, the default enable valve assembly having a first position that terminates the drive fluid signal and the reverse fluid signal and a second position that communicates the drive fluid signal to a drive default fluid signal and the reverse fluid signal to a reverse default fluid signal;
　a default select valve assembly that receives the drive default fluid signal, the default select valve assembly having a first position that communicates the drive default fluid signal to a first exhaust signal and a second position that communicates the drive default fluid signal to a second exhaust signal;
　a plurality of clutch regulation valve assemblies each in direct fluid communication with the pressure regulation subsystem and selectively in fluid communication with the first exhaust signal, the second exhaust signal, the drive default signal, and the reverse default signal; and
　a plurality of clutches selectively engaged by the plurality of clutch regulation valve assemblies,
　wherein a first subset of the plurality of clutches are engaged to provide a neutral lock turbine mode when the manual valve is in the park position or the neutral position, and
　wherein the default enable valve assembly enables three default modes of operation and the default select valve assembly selects between two of the three default modes of operation.

12. The hydraulic control system of claim 11 wherein the three default modes of operation include a low forward gear, a high forward gear, and a reverse gear, and the default select valve assembly selects between the low forward gear and the high forward gear.

13. The hydraulic control system of claim 12 wherein the plurality of clutches includes six clutches selectively engageable in combinations of four to provide at least 10 forward speed ratios and one reverse speed ratio.

14. The hydraulic control system of claim 13 wherein the plurality of clutch regulation valve assemblies include six clutch regulation valve assemblies, each one in fluid communication with a respective one of the six clutches, and wherein each of the six clutch regulation valve assemblies includes an exhaust port that exhausts a respective one of the six clutches.

15. The hydraulic control system of claim 14 wherein the first exhaust signal communicates with a first of two exhaust ports, the second exhaust signal communicates with a second of two exhaust ports, and the drive default signal communicates with a third of two exhaust ports, one of which via a first three-way valve.

16. The hydraulic control system of claim 15 wherein the first exhaust signal and drive default signal engages a first subset of clutches to produce the low forward gear and the second exhaust signal and drive default signal engages a second subset of clutches to produce the high forward gear when the hydraulic control system is in a default mode of operation and the manual valve is in the drive position.

17. The hydraulic control system of claim 16 wherein the reverse default signal communicates with four of the exhaust ports.

18. The hydraulic control system of claim 17 wherein the reverse default signal engages a third subset of clutches to produce the reverse gear when the hydraulic control system is in the default mode of operation and the manual valve is in the reverse position.

19. The hydraulic control system of claim 11 further comprising a torque converter control subsystem in fluid communication with the pressure regulation subsystem, and wherein the neutral lock turbine mode generates heat in the torque converter control subsystem by locking an input shaft of the transmission.

20. A hydraulic control system for a transmission of a motor vehicle, the hydraulic control system comprising:
　a pressure regulation subsystem in fluid communication with a pump for providing pressurized hydraulic fluid;
　a plurality of clutches for producing a plurality of forward gear ratios and a reverse gear ratio when selectively engaged;
　a manual valve in direct fluid communication with the pressure regulation subsystem, wherein the manual valve is moveable by an operator of the motor vehicle between at least a park position, a neutral position, a drive position, and a reverse position and selectively provides a drive fluid signal and a reverse fluid signal from the pressurized hydraulic fluid;
　a default enable valve assembly that receives the drive fluid signal and the reverse fluid signal, the default enable valve assembly having a first position that terminates the drive fluid signal and the reverse fluid signal and a second position that communicates the drive fluid signal to a drive default fluid signal and the reverse fluid signal to a reverse default fluid signal;
　a default select valve assembly that receives the drive default fluid signal, the default select valve assembly having a first position that communicates the drive default fluid signal to a first exhaust signal and a second position that communicates the drive default fluid signal to a second exhaust signal;
　a plurality of clutch regulation valve assemblies each in direct fluid communication with the pressure regulation subsystem and selectively in fluid communication with the first exhaust signal, the second exhaust signal, the drive default signal, and the reverse default signal, the plurality of clutch regulation valve assemblies each having a disengaged position and an engaged position, wherein when in the engage position the clutch regulation valve assemblies communicate the pressurized fluid from the pressure regulation subsystem to the plurality of clutches and when in a disengaged system communicate the plurality of clutches with an exhaust port, wherein a first subset of the plurality of clutches are engaged to provide a neutral lock turbine mode when the manual valve is in the park position or the neutral position by moving the corresponding clutch regulation valve assemblies to the engaged position, and wherein during a default condition, the default enable valve assembly moves to the second position and the default select valve assembly remains in either the first position or the second position based on the which of the plurality of clutches are currently engaged when the default condition occurs in order to provide a low forward gear or a high forward gear when the manual valve is in the drive position or a reverse gear when the manual valve is in the reverse position.

* * * * *